United States Patent
Takahashi et al.

(10) Patent No.: US 7,897,291 B2
(45) Date of Patent: Mar. 1, 2011

(54) MEMBRANE ELECTRODE ASSEMBLY FOR USE IN SOLID POLYMER ELECTROLYTE FUEL CELL

(75) Inventors: Ryoichiro Takahashi, Wako (JP); Yoichi Asano, Wako (JP); Shintaro Tanaka, Wako (JP); Takuma Yamawaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1067 days.

(21) Appl. No.: 11/698,873

(22) Filed: Jan. 29, 2007

(65) Prior Publication Data

US 2007/0218347 A1   Sep. 20, 2007

(30) Foreign Application Priority Data

Mar. 14, 2006  (JP) ............................. 2006-069872

(51) Int. Cl.
- H01M 8/02 (2006.01)
- H01M 8/10 (2006.01)
- H01M 4/94 (2006.01)
- H01M 4/96 (2006.01)

(52) U.S. Cl. ..................... 429/480; 429/479; 429/481

(58) Field of Classification Search ............. 429/42, 429/44, 479–481
See application file for complete search history.

(56) References Cited

U.S. PATENT DOCUMENTS

| | | | | |
|---|---|---|---|---|
| 5,840,414 A | * | 11/1998 | Bett et al. | 428/307.7 |
| 6,428,722 B1 | * | 8/2002 | Furuya | 252/510 |
| 2003/0104267 A1 | * | 6/2003 | Haridoss et al. | 429/44 |

FOREIGN PATENT DOCUMENTS

| | | |
|---|---|---|
| JP | 06-052871 | 2/1994 |
| JP | 06-275282 | 9/1994 |
| JP | 2004-031325 | 1/2004 |

* cited by examiner

*Primary Examiner*—Gregg Cantelmo
(74) *Attorney, Agent, or Firm*—Arent Fox LLP

(57) ABSTRACT

A membrane electrode assembly including: a solid polymer electrolyte membrane having proton conductivity; a cathode electrode catalyst layer disposed on one side of the solid polymer electrolyte membrane; an anode electrode catalyst layer disposed on the other side of the solid polymer electrolyte membrane; and two gas diffusion layers disposed on a side of the cathode electrode catalyst layer and a side of the anode electrode catalyst layer, respectively; wherein the gas diffusion layer in the anode side is smaller in contact angle to water than the gas diffusion layer in the cathode side. The membrane electrode assembly also includes at least two coating layers different in properties from each other between the gas diffusion layer and the cathode electrode catalyst layer, and at least two coating layers different in properties from each other between the gas diffusion layer and the anode electrode catalyst layer.

1 Claim, 2 Drawing Sheets

MEMBRANE ELECTRODE ASSEMBLY FOR USE IN SOLID POLYMER ELECTROLYTE FUEL CELL

BACKGROUND OF THE INVENTION

1. Field of the Invention

The present invention relates to a membrane electrode assembly for use in a solid polymer electrolyte fuel cell.

2. Description of the Related Art

Oil resources have been depleted, and at the same time, environmental problems including the global warming caused by fossil fuel consumption have been increasingly serious. Accordingly, fuel cells have attracted attention as clean electric power supplies for electric motors not involving the generation of carbon dioxide, and thus have been extensively developed and partially begin to be used practically. When the fuel cells are mounted in automobiles and the like, solid polymer electrolyte fuel cells using solid polymer electrolyte membranes are preferably used because such fuel cells can easily provide high voltage and large electric current.

Known as a membrane electrode assembly to be used in the solid polymer electrolyte fuel cell is a membrane electrode assembly which comprises a pair of electrode catalyst layers disposed on both sides of a solid polymer electrolyte membrane having proton conductivity, and gas diffusion layers laminated respectively on the electrode catalyst layers. Each of the pair of the electrode catalyst layers is formed by supporting a catalyst such as platinum on a catalyst carrier such as carbon black and by integrating the supported catalyst into a single piece with an ion conducting polymer binder; one of the electrode catalyst layers acts as a cathode electrode catalyst layer and the other as an anode electrode catalyst layer. The gas diffusion layers are formed of, for example, carbon paper. The membrane electrode assembly constitutes the solid polymer electrolyte fuel cell in combination with separators each doubling as a gas path and respectively being laminated on the gas diffusion layers.

In the solid polymer electrolyte fuel cell, the anode electrode catalyst layer is used as a fuel electrode into which a reductive gas such as hydrogen or methanol is introduced through the intermediary of the gas diffusion layer, and the cathode electrode catalyst layers is used as an oxygen electrode into which an oxidative gas such as air or oxygen is introduced through the intermediary of the gas diffusion layer. In this configuration, protons and electrons are generated in the anode electrode catalyst layer from the reductive gas by the action of the catalyst contained in the electrode catalyst layer, and the protons migrate to the electrode catalyst layer of the oxygen electrode side through the solid polymer electrolyte membrane. The protons react with the oxidative gas and the electrons introduced into the oxygen electrode to generate water in the cathode electrode catalyst layer by the action of the catalyst contained in the electrode catalyst layer. Consequently, connection of the anode electrode catalyst layer and the cathode electrode catalyst layer with a conductive wire makes it possible to form a circuit to transport the electrons generated in the anode electrode catalyst layer to the cathode electrode catalyst layer and to take out electric current.

As described above, in the membrane electrode assembly, the electric power generation is accompanied by the generation of water in the cathode electrode catalyst layer. Consequently, a long-time operation of the fuel cell makes excessive the moisture in the membrane electrode assembly to inhibit the diffusion of the reductive gas or the oxidative gas, and hence this case also suffers from a problem that no sufficient electric power generation performance can be attained. With respect to this problem, well known is a membrane electrode assembly in which the electrode catalyst layer is made water-repellent to facilitate the discharge of the generated water (see Japanese Patent Laid-Open No. 6-52871).

In the membrane electrode assembly, the protons migrate along with water in the solid polymer electrolyte membrane. Accordingly, the solid polymer electrolyte membrane needs to have appropriate moisture. Such moisture is supplied, for example, by the reductive gas or the oxidative gas. However, there is a problem in that no sufficient electric power generation performance can be attained under the low-humidity conditions that the humidity of the reductive gas or the oxidative gas is lower as compared to the humidity in the steady operation such as a high load operation.

A possible means for solving the above described problem is a regulation of the hydrophilicities in the cathode side and the anode side in the membrane electrode assembly. As a technique to regulate such hydrophilicities, for example, known is a membrane electrode assembly in which the gas diffusion layer in the cathode side is formed with a carbon-containing material and the surface of the carbon-containing material is modified to be hydrophilic (see Japanese Patent Laid-Open No. 2004-31325).

Also known is a membrane electrode assembly in which the catalyst carrier of the electrode catalyst layer is made hydrophilic (see Japanese Patent Laid-Open No. 6-275282).

However, the above described conventional techniques involve disadvantages, namely, fears that under the conditions that the temperature of the membrane electrode assembly is not sufficiently raised yet, for example, at the time of start-up and hence the humidity is higher than that in the steady operation, the water generated in the cathode electrode catalyst layer stays inside the membrane electrode assembly to inhibit the gas diffusion, and consequently no sufficient electric power generation performance can be attained.

SUMMARY OF THE INVENTION

An object of the present invention is to provide a membrane electrode assembly for use in a solid polymer electrolyte fuel cell which assembly can attain an excellent electric power generation performance both under low-humidity conditions and under high-humidity conditions through overcoming such disadvantages as described above.

For the purpose of achieving the above described object, the present invention provides a membrane electrode assembly for use in a solid polymer electrolyte fuel cell, the membrane electrode assembly comprising: a solid polymer electrolyte membrane having proton conductivity; a cathode electrode catalyst layer disposed on one side of the solid polymer electrolyte membrane; an anode electrode catalyst layer disposed on the other side of the solid polymer electrolyte membrane; and two gas diffusion layers disposed on a side of the cathode electrode catalyst layer and a side of the anode electrode catalyst layer, respectively, both these sides facing away from the solid polymer electrolyte membrane; wherein the gas diffusion layer in the anode side is smaller in contact angle to water than the gas diffusion layer in the cathode side.

In the membrane electrode assembly, for use in a solid polymer electrolyte fuel cell, of the present invention, the gas diffusion layer in the anode side is smaller in contact angle to water than the gas diffusion layer in the cathode side. Accordingly, the gas diffusion layer in the anode side is relatively hydrophilic, and the gas diffusion layer in the cathode side is relatively hydrophobic.

When the gas diffusion layer is made hydrophilic, the water retentivity thereof is increased and accordingly the gas diffusivity is decreased. However, the reductive gas such as hydrogen supplied to the gas diffusion layer in the anode side is smaller in molecular size than the oxidative gas such as oxygen and air supplied to the gas diffusion layer in the cathode side, and hence even when the gas diffusion layer in the anode side is made hydrophilic, the gas diffusion is hardly inhibited. Additionally, by making hydrophilic the gas diffusion layer in the anode side, moisture can be made present evenly on the side contributing to the electric power generation.

On the other hand, by making hydrophobic the gas diffusion layer in the cathode side, the moisture generated in the cathode electrode catalyst layer as a result of the electric power generation can be discharged rapidly, and the diffusivity of the oxidative gas such as oxygen or air can also be ensured.

Consequently, according to the membrane electrode assembly, for use in a solid polymer electrolyte fuel cell, of the present invention, the gas diffusivities and the moisture distributions of the individual electrode catalyst layers can be made appropriate, and thus an excellent electric power generation can be attained.

Additionally, the membrane electrode assembly, for use in a solid polymer electrolyte fuel cell, of the present invention preferably comprises at least two coating layers different in properties from each other between each of the gas diffusion layers and the electrode catalyst layer pairing therewith. By laminating coating layers different in properties from each other on each of the gas diffusion layers, the gas diffusion layers can finely control the relative hydrophilicity in the anode side and the relative hydrophobicity in the cathode side.

DETAILED DESCRIPTION OF THE PREFERRED EMBODIMENTS

Further detailed description is made on an embodiment of the present invention with reference to the accompanying drawings.

Figure 1:
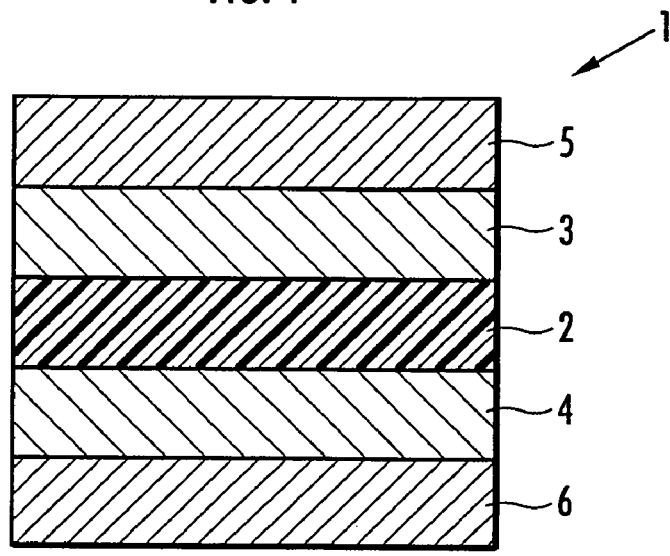
FIG. 1 is a schematic sectional view illustrating a configuration of a membrane electrode assembly of an embodiment of the present invention.

As shown in FIG. 1, a membrane electrode assembly 1 of the present embodiment comprises: a cathode electrode catalyst layer 3 disposed on one side of a solid polymer electrolyte membrane 2 having proton conductivity; an anode electrode catalyst layer 4 disposed on the other side of the solid polymer electrolyte membrane 2; and two gas diffusion layers 5 and 6 disposed on a side of the cathode electrode catalyst layer 3 and a side of the anode electrode catalyst layer 4, respectively, both these sides facing away from the solid polymer electrolyte membrane 2.

For the solid polymer electrolyte membrane 2, a film formed of a polymer belonging to the cation exchange resin and having proton conductivity can be used. Examples of the cation exchange resin may include: sulfonated vinyl polymers such as polystyrene sulfonic acid; polymers obtained by introducing sulfonic acid groups or phosphoric acid groups into heat resistant polymers such as perfluoroalkylsulfonic acid polymers and perfluoroalkylcarboxylic acid polymers, polybenzimidazole and polyether ether ketone; and polymers obtained by introducing sulfonic acid groups into the polymers comprising, as the main component, rigid-rod polyphenylene obtained by polymerizing aromatic compounds so as to include a phenylene chain.

The electrode catalyst layers 3 and 4 each are formed by integrating into a single piece a catalyst such as platinum supported on a catalyst carrier such as carbon black with an ion conducting polymer binder. Such electrode catalyst layers 3 and 4 can be formed by coating the both sides of the solid polymer electrolyte membrane 2 with a paste which is obtained by mixing a catalyst such as platinum supported on a catalyst carrier such as carbon black with a solution of a resin of the same type as the solid polymer electrolyte membrane 2, and by thereafter drying the coated paste.

As for the gas diffusion layers 5 and 6, the gas diffusion layer 6 in the anode side is smaller in contact angle to water than the gas diffusion layer 5 in the cathode side. Such gas diffusion layers 5 and 6 can be formed, for example, as follows: the gas diffusion layer 5 in the cathode side is formed by using an untreated carbon paper or by using a carbon paper subjected to a water-repellent treatment, and the gas diffusion layer 6 in the anode side is formed by using a carbon paper subjected to a hydrophilization treatment.

The water-repellent treatment of the carbon paper can be carried out, for example, by impregnating the carbon paper with a solution of tetrafluoroethylene-tetrafluoropropylene copolymer and by thereafter heat treating the carbon paper. Additionally, the hydrophilization treatment of the carbon paper can be carried out by impregnating the carbon paper with an aqueous solution of a metal oxide such as titanium oxide and by thereafter heat treating the carbon paper.

The hydrophilized gas diffusion layer 6 in the anode side preferably has a contact angle to water of 20° or less, and may also be in a condition that the contact angle measurement is made impossible by the penetration of water into the gas diffusion layer 6 (the condition to be described with the contact angle of 0°).

The membrane electrode assembly 1 can be formed as follows: as described above, the electrode catalyst layers 3 and 4 are formed respectively on both sides of the solid polymer electrolyte membrane 2, thereafter the gas diffusion layers 5 and 6 are laminated respectively on the electrode catalyst layers 3 and 4, and the laminate thus obtained is hot pressed to be bonded into one piece.

Figure 2:
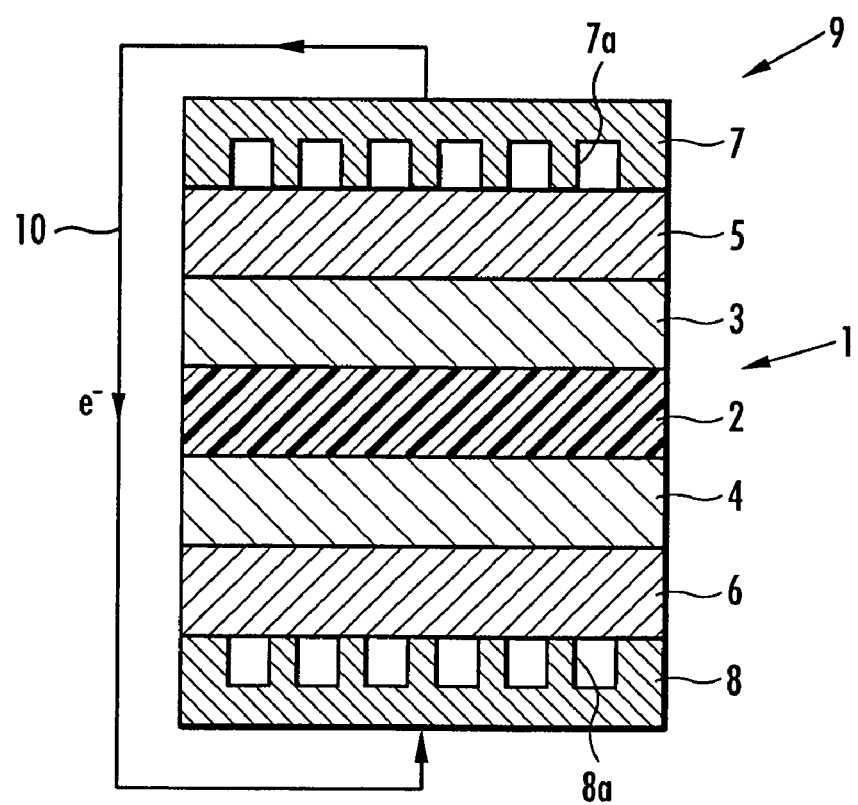
FIG. 2 is a schematic sectional view illustrating a configuration of a fuel cell using the membrane electrode assembly shown in FIG. 1.

As shown in FIG. 2, the membrane electrode assembly 1 can constitute a fuel cell 9 through further lamination of the separators 7 and 8 respectively on the gas diffusion layers 5 and 6. As the separators 7 and 8, for example, carbon materials or metal materials respectively having grooves 7a and 8a can be used, and the separators 7 and 8 are laminated respectively on the gas diffusion layers 5 and 6 so as for the separator sides having the grooves 7a and 8a to face the gas diffusion layers 5 and 6, respectively.

In the fuel cell 9 shown in FIG. 2, the reductive gas such as hydrogen is introduced by using the grooves 8a of the separator 8 in the anode side as the flow channels, and the oxidative gas such as air or oxygen is introduced by using the grooves 7a of the separator 7 in the cathode side as the flow channels. In this way, first, in the anode side, the reductive gas introduced from the flow channels 8a is supplied to the anode electrode catalyst layer 4 through the intermediary of the gas diffusion layer 6. In the anode electrode catalyst layer 4, protons and electrons are generated from the reductive gas by the action of the catalyst, and the protons migrate to the cathode electrode catalyst layer 3 through the solid polymer electrolyte membrane 2.

Next, in the cathode side, the oxidative gas introduced from the flow channels 7a is supplied to the cathode electrode catalyst layer 3 through the intermediary of the gas diffusion layer 5. In the cathode electrode catalyst layer 3, the protons react with the oxidative gas and the electrons to generate water by the action of the catalyst. Consequently, connection of the separators 7 and 8 with a conductive wire makes it possible to form a circuit 10 to transport the electrons generated in the anode side to the cathode side and to take out electric current.

The protons migrate along with water when migrating through the solid polymer electrolyte membrane 2, and accordingly, the membrane electrode assembly 1 needs to have appropriate moisture. Such moisture can be supplied to the membrane electrode assembly 1, for example, by humidifying the reductive gas and the oxidative gas.

In this connection, the fuel cell 9 is in a high humidity condition either immediately after the start of the operation or in a long time operation as follows: immediately after the start of the operation, the temperature of the cell is not sufficiently raised yet and the reductive gas and the oxidative gas each are in a highly humidified condition as compared to the condition in the steady operation; and in the long time operation, the moisture becomes excessive due to the water generated in the cathode electrode catalyst layer 3. Consequently, there is a fear that in the fuel cell 9, the diffusion of the reductive gas or the oxidative gas is inhibited and no sufficient electric power generation performance can be attained.

However, in the membrane electrode assembly 1, the gas diffusion layer 6 in the anode side is smaller in contact angle to water than the gas diffusion layer 5 in the cathode side. Accordingly, the gas diffusion layer 6 is relatively hydrophilic, and the gas diffusion layer 5 is relatively hydrophobic.

Accordingly, the gas diffusion layer 6 in the anode side is made easier in retaining moisture, and moisture can be made present evenly on the side contributing to the electric power generation. Additionally, the reductive gas such as hydrogen supplied to the gas diffusion layer 6 is smaller in molecular size than the oxidative gas such as oxygen and air, and hence even when the gas diffusion layer 6 retains moisture, the gas diffusion is hardly inhibited.

On the other hand, in the gas diffusion layer 5 in the cathode side, by making it relatively hydrophobic, the moisture generated in the cathode electrode catalyst layer as a result of the electric power generation can be discharged rapidly, and the diffusivity of the oxidative gas such as oxygen or air supplied to the gas diffusion layer 5 can also be ensured.

Consequently, according to the membrane electrode assembly 1, an excellent electric power generation performance can be attained even under the high-humidity conditions immediately after the start of the operation.

Figure 3:
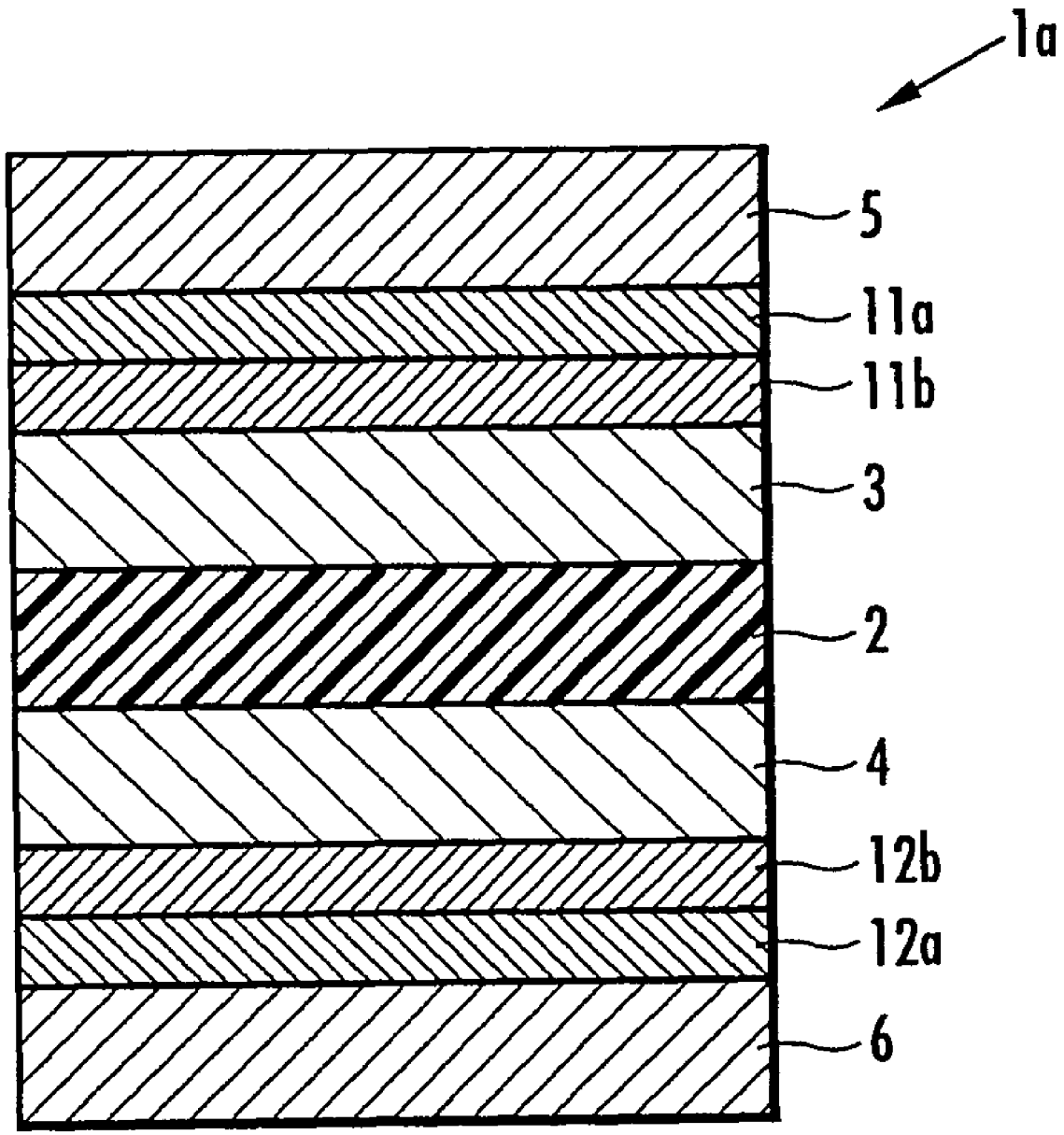
FIG. 3 is a schematic sectional view illustrating a configuration of another membrane electrode assembly of the embodiment of the present invention.

Further, as shown as a membrane electrode assembly 1a in FIG. 3, in the membrane electrode assembly 1, the gas diffusion layer 5 may comprise two coating layers 11a and 11b different in properties from each other between the gas diffusion layer 5 and the electrode catalyst layer 3, and the gas diffusion layer 6 may comprise two coating layers 12a and 12b different in properties from each other between the gas diffusion layer 6 and the electrode catalyst layer 4. By laminating the coating layers 11a and 11b different in properties from each other, the gas diffusion layer 5 can finely control the relative hydrophobicity, and by laminating the coating layers 12a and 12b different in properties from each other, the gas diffusion layer 6 can finely control the relative hydrophilicity.

The set of the coating layers 11a and 11b and the set of the coating layers 12a and 12b can be formed by coating the gas diffusion layers 5 and 6, respectively, with pastes in such a way that each of the coating layers is formed of a paste obtained by mixing a carbon powder such as carbon black with a water-repellent resin such as polytetrafluoroethylene or a binder such as an ion conducting polymer, and with ethylene glycol, tetrafluoroethylene-tetrafluoropropylene copolymer, or an organic solvent such as N-methyl-2-pyrrolidone (NMP), and by thereafter heat treating the coated paste. In this formation, the coating layers 11a, 11b, 12a and 12b can be made different in properties from each other by varying the type of the carbon powder.

As for the coating layers 11a, 11b, 12a and 12b, the coating layers 11a and 11b have only to be different from each other, and the coating layers 12a and 12b have only to be different from each other; the coating layer 11a may be the same as the coating layer 12a or the coating layer 12b, and the coating layer 11b may be the same as the coating layer 12a or the coating layer 12b.

Additionally, in the present embodiment, description is made on the case where the diffusion layer 5 comprises the set of the two coating layers 11a and 11b different in properties from each other between the gas diffusion layer 5 and the electrode catalyst layer 3, and the gas diffusion layer 6 comprises the set of the two coating layers 12a and 12b different in properties from each other between the gas diffusion layer 6 and the electrode catalyst layer 4. However, each set has only to be composed of two or more coating layers different from each other, and the number of the coating layers in each set is not limited to two.

Next, examples and comparative examples of the present invention will be described below.

Example 1

In the present example, at the beginning, the gas diffusion layer 6 in the anode side was formed by impregnating a sheet of carbon paper with a 5% by weight aqueous solution of titanium oxide and by thereafter heating for drying the impregnated carbon paper at 500° C. for 30 minutes for hydrophilization treatment. The carbon paper had an coating weight (weight per unit area) of 80 g/m$^2$, a thickness of 190 μm, a mean through-hole diameter of 22 μm, and a specific surface area of 0.47 m$^2$/g.

Next, a first mixed paste was prepared by mixing under stirring 12 g of carbon black (trade name: Vulcan, manufactured by Cabot Corp.), 18 g of a tetrafluoroethylene powder (manufactured by Asahi Glass Co., Ltd.) and 154 g of ethylene glycol. Then, the first mixed paste was applied onto the gas diffusion layer 6 formed as described above in the anode side so as for the dry weight of the coated first mixed paste to be 2.0 mg/cm$^2$ by means of screen printing, and heated for drying at 380° C. for 30 minutes to form the coating layer 12a.

Next, a second mixed paste was prepared by mixing under stirring 5.0 g of carbon black (Ketchen Black), 2.5 g of a vapor-grown carbon (trademark: VGCF, manufactured by Showa Denko Co., Ltd.) and 6 g of an ion conducting polymer (trademark: Nafion, manufactured by Du Pont Corp.). Then, the second mixed paste was applied onto the coating layer 12a formed as described above so as for the dry weight of the coated second mixed paste to be 0.4 mg/cm$^2$ by means of screen printing, and heated for drying at 120° C. for 60 minutes to form the coating layer 12b.

Next, the same carbon paper as used for the gas diffusion layer 6 in the anode side was subjected to a water-repellent treatment by heating for drying treatment at 380° C. for 30 minutes to form the gas diffusion layer 5 in the cathode side.

Next, the gas diffusion layer 5 and the gas diffusion layer 6 were subjected to a measurement of the contact angle to water. The results thus obtained are shown in Table 1.

Next, a third mixed paste was prepared by mixing under stirring 12 g of the vapor-grown carbon (trademark: VGCF, manufactured by Showa Denko Co., Ltd.), 20 g of tetrafluoroethylene-tetrafluoropropylene copolymer and 200 g of ethylene glycol. Then, the third mixed paste was applied onto the gas diffusion layer 5 formed as described above in the cathode side so as for the dry weight of the coated third mixed paste to be 2.0 mg/cm$^2$ by means of screen printing, and heated for drying at 380° C. for 30 minutes to form the coating layer 11a.

Next, the same second mixed paste as used for the gas diffusion layer 6 in the anode side was applied onto the coating layer 11a formed as described above so as for the dry weight of the coated second mixed paste to be 0.4 mg/cm$^2$ by means of screen printing, and heated for drying at 120° C. for 60 minutes to form the coating layer 11b.

Next, a mixed catalyst paste was prepared by mixing under stirring 10 g of a platinum-ruthenium alloy-supporting carbon particle (weight percentage loading: 50%), 40 g of a 20% solution of an ion conducting polymer (trademark: Nafion, manufactured by Du Pont Corp), 90 g of n-propyl alcohol and 10 g of water. Then, the mixed catalyst paste was applied onto one side of a solid polymer electrolyte membrane 2 (trade name: Nafion (trademark) 112, manufactured by Du Pont Corp.) so as for the platinum-ruthenium alloy content to be 0.15 mg/cm$^2$ and heated for drying at 120° C. for 15 minutes to form the anode electrode catalyst layer 4 on one side of the solid polymer electrolyte membrane 2. Then, the cathode electrode catalyst layer 3 was formed on the other side of the solid polymer electrolyte membrane 2 in the same manner as for the anode electrode catalyst layer 4 except that the platinum-ruthenium alloy-supporting carbon particle in the catalyst mixed paste was replaced with a platinum-supporting carbon particle.

Next, on the solid polymer electrolyte membrane 2 with the electrode catalyst layers 3 and 4 formed thereon, the gas diffusion layer 5 with the coating layers 11a and 11b formed thereon and the gas diffusion layer 6 with the coating layers 12a and 12b formed thereon were laminated in such a way that the coating layer 11b was bonded to the electrode catalyst layer 3 and the coating layer 12b was bonded to the electrode catalyst layer 4 to form a laminate; the laminate thus obtained was hot press-bonded at 140° C. at a contact pressure of 2.94 MPa for 5 minutes to fabricate a membrane electrode assembly 1a shown in FIG. 3.

Next, the separators 7 and 8 were laminated respectively on the gas diffusion layers 5 and 6 of the membrane electrode assembly 1a, respectively to form a fuel cell; then, hydrogen and air were humidified respectively using external humidifiers, and were made to flow through the flow channels 8a in the anode side and the flow channels 7a in the cathode side, respectively. The electric power generation performance was evaluated by measuring the terminal voltages at currents of 0.1 A/cm$^2$ and 1.0 A/cm$^2$ under the following three different conditions: the high-humidity conditions such that the cell temperature was 57° C., and the relative humidities of the gas introduction devices in the anode and cathode sides were both 100% RH; the medium-humidity conditions such that the cell temperature was 72° C., and the relative humidities of the gas introduction devices in the anode and cathode sides were both 50% RH; and the low-humidity conditions such that the cell temperature was 57° C., and the relative humidities of the gas introduction devices in the anode and cathode sides were both 29% RH. The terminal voltages at the current of 0.1 A/cm$^2$ are shown in Table 2 and the terminal voltages at the current of 1.0 A/cm$^2$ are shown in Table 3.

Example 2

In present example, the gas diffusion layers 5 and 6 were subjected to the measurement of the contact angle to water, and the gas diffusion layer 5 with the coating layers 11a and 11b formed thereon and the gas diffusion layer 6 with the coating layers 12a and 12b formed thereon were obtained, in the same manner as in Example 1, except that the gas diffusion layer 5 in the cathode side was formed by impregnating the same carbon paper as used in Example 1 with a 10% by weight solution of tetrafluoroethylene-tetrafluoropropylene copolymer and by thereafter heating for drying at 120° C. for 60 minutes for water-repellent treatment. The results of the measurement of the contact angle to water for the gas diffusion layers 5 and 6 are shown in Table 1.

Next, by using the gas diffusion layer 5 with the coating layers 11a and 11b formed thereon and the gas diffusion layer 6 with the coating layers 12a and 12b formed thereon, a membrane electrode assembly 1a shown in FIG. 3 was fabricated in the same manner as in Example 1.

Next, the separators 7 and 8 were laminated on the gas diffusion layers 5 and 6 of the membrane electrode assembly 1a, respectively to form a fuel cell, and the electric power generation performance thereof was evaluated in the same manner as in Example 1. The terminal voltages at the current of 0.1 A/cm$^2$ are shown in Table 2 and the terminal voltages at the current of 1.0 A/cm$^2$ are shown in Table 3.

Comparative Example 1

In present comparative example, the gas diffusion layers 5 and 6 were subjected to the measurement of the contact angle to water, and the gas diffusion layer 5 with the coating layers 11a and 11b formed thereon and the gas diffusion layer 6 with the coating layers 12a and 12b formed thereon were obtained, in the same manner as in Example 1, except that the gas diffusion layers 5 and 6 were formed by impregnating the same carbon paper as used in Example 1 with a 10% by weight solution of tetrafluoroethylene-tetrafluoropropylene copolymer and by thereafter heating for drying at 120° C. for 60 minutes for water-repellent treatment. The results of the measurement of the contact angle to water for the gas diffusion layers 5 and 6 are shown in Table 1.

Next, by using the gas diffusion layer 5 with the coating layers 11a and 11b formed thereon and the gas diffusion layer 6 with the coating layers 12a and 12b formed thereon, a membrane electrode assembly 1a shown in FIG. 3 was fabricated in the same manner as in Example 1.

Next, the separators 7 and 8 were laminated on the gas diffusion layers 5 and 6 of the membrane electrode assembly 1a, respectively to form a fuel cell, and the electric power generation performance thereof was evaluated in the same manner as in Example 1. The terminal voltages at the current of 0.1 A/cm$^2$ are shown in Table 2 and the terminal voltages at the current of 1.0 A/cm$^2$ are shown in Table 3.

Comparative Example 2

In present comparative example, the gas diffusion layers 5 and 6 were subjected to the measurement of the contact angle to water, and the gas diffusion layer 5 with the coating layers 11a and 11b formed thereon and the gas diffusion layer 6 with the coating layers 12a and 12b formed thereon were obtained, in the same manner as in Example 1, except that the gas diffusion layers 5 and 6 were formed by heating for drying the same carbon paper as used in Example 1 at 380° C. for 30 minutes for water-repellent treatment. The results of the measurement of the contact angle to water for the gas diffusion layers 5 and 6 are shown in Table 1.

Next, by using the gas diffusion layer 5 with the coating layers 11a and 11b formed thereon and the gas diffusion layer 6 with the coating layers 12a and 12b formed thereon, a membrane electrode assembly 1a shown in FIG. 3 was fabricated in the same manner as in Example 1.

Next, the separators 7 and 8 were laminated on the gas diffusion layers 5 and 6 of the membrane electrode assembly 1a, respectively to form a fuel cell, and the electric power generation performance thereof was evaluated in the same manner as in Example 1. The terminal voltages at the current of 0.1 A/cm² are shown in Table 2 and the terminal voltages at the current of 1.0 A/cm² are shown in Table 3.

Comparative Example 3

In present comparative example, the gas diffusion layers 5 and 6 were subjected to the measurement of the contact angle to water, and the gas diffusion layer 5 with the coating layers 11a and 11b formed thereon and the gas diffusion layer 6 with the coating layers 12a and 12b formed thereon were obtained, in the same manner as in Example 1, except that the gas diffusion layers 5 and 6 were formed by impregnating the same carbon paper as used in Example 1 with a 5% by weight aqueous solution of titanium oxide and by thereafter heating for drying at 500° C. for 30 minutes for hydrophilization treatment. The results of the measurement of the contact angle to water for the gas diffusion layers 5 and 6 are shown in Table 1.

Next, by using the gas diffusion layer 5 with the coating layers 11a and 11b formed thereon and the gas diffusion layer 6 with the coating layers 12a and 12b formed thereon, a membrane electrode assembly 1a shown in FIG. 3 was fabricated in the same manner as in Example 1.

Next, the separators 7 and 8 were laminated on the gas diffusion layers 5 and 6 of the membrane electrode assembly 1a, respectively to form a fuel cell, and the electric power generation performance thereof was evaluated in the same manner as in Example 1. The terminal voltages at the current of 0.1 A/cm² are shown in Table 2 and the terminal voltages at the current of 1.0 A/cm² are shown in Table 3.

TABLE 1

|  | Contact angle to water (°) | |
|---|---|---|
|  | Anode side | Cathode side |
| Example 1 | 0 | 125 |
| Example 2 | 0 | 145 |
| Comparative Example 1 | 145 | 145 |
| Comparative Example 2 | 125 | 125 |
| Comparative Example 3 | 0 | 0 |

TABLE 2

| | Terminal voltage (V) at 0.1 A/cm² | | |
|---|---|---|---|
| | Low-humidity conditions | Medium-humidity conditions | High-humidity conditions |
| Example 1 | 0.80 | 0.84 | 0.85 |
| Example 2 | 0.80 | 0.84 | 0.85 |
| Comparative Example 1 | 0.78 | 0.83 | 0.83 |
| Comparative Example 2 | 0.78 | 0.83 | 0.84 |
| Comparative Example 3 | 0.78 | 0.83 | 0.85 |

TABLE 3

| | Terminal voltage (V) at 1.0 A/cm² | | |
|---|---|---|---|
| | Low-humidity conditions | Medium-humidity conditions | High-humidity conditions |
| Example 1 | 0.52 | 0.64 | 0.63 |
| Example 2 | 0.48 | 0.63 | 0.62 |
| Comparative Example 1 | 0.47 | 0.61 | 0.61 |
| Comparative Example 2 | 0.47 | 0.62 | 0.62 |
| Comparative Example 3 | 0.48 | 0.62 | —[*1] |

[*1]The current did not reach 1.0 A/cm², and no measurement was possible.

As can be seen from Table 1, in any of Examples 1 and 2, the gas diffusion layer 6 in the anode side is smaller in contact angle to water than the gas diffusion layer 5 in the cathode side, and hence the gas diffusion layer 6 is hydrophilic relative to the gas diffusion layer 5. As can also be seen from Table 1, in any of Comparative Examples 1 to 3, the gas diffusion layer 6 in the anode side and the gas diffusion layer 5 in the cathode side are the same with respect to the contact angle to water, and hence the gas diffusion layer 6 and the gas diffusion layer 5 are the same with respect to the hydrophilicity.

As can be seen from Tables 2 and 3, any of the membrane electrode assemblies 1a of Examples 1 and 2 in each of which the gas diffusion layer 6 in the anode side is smaller in contact angle to water than the gas diffusion layer 5 in the cathode side can attain an electric power generation performance superior to that of any of the membrane electrode assemblies 1a of Comparative Examples 1 to 3 in each of which the gas diffusion layer 6 in the anode side is the same as the gas diffusion layer 5 in the cathode side with respect to the contact angle to water; in particular, even in Example 1, an excellent electric power generation performance can be attained under the low-humidity conditions.

What is claimed is:

1. A membrane electrode assembly for use in a solid polymer electrolyte fuel cell, the membrane electrode assembly comprising:
a solid polymer electrolyte membrane having proton conductivity;
a cathode electrode catalyst layer disposed on one side of the solid polymer electrolyte membrane;
an anode electrode catalyst layer disposed on the other side of the solid polymer electrolyte membrane;
two gas diffusion layers disposed on a side of the cathode electrode catalyst layer and a side of the anode electrode catalyst layer, respectively, both these sides facing away from the solid polymer electrolyte membrane;
wherein the gas diffusion layer in the anode side is impregnated with titanium oxide and thereafter treated with heat, and the gas diffusion layer in the cathode side is subject to a water-repellent treatment;

a first coating layer, formed between the gas diffusion layer of the anode side and the anode electrode catalyst layer, by coating a first mixed paste prepared by mixing carbon black, tetrafluoroethylene powder, and ethylene glycol onto the gas diffusion layer of the anode side and thereafter heat treating;

a second coating layer formed between the first coating layer and the anode electrode catalyst layer by coating a second mixed paste prepared by mixing carbon black having a larger surface area than the carbon black used in the first mixed paste, vapor-grown carbon, and ion conducting polymer onto the first coating layer and thereafter heat treating;

a third coating layer formed between the gas diffusion layer of the cathode side and the cathode electrode catalyst layer, by coating a third mixed paste prepared by mixing vapor-grown carbon, tetrafluoroethylene-tetrafluoropropylene copolymer, and ethylene glycol onto the gas diffusion layer of the cathode side and thereafter heat treating; and a fourth coating layer formed between the third coating layer and the cathode electrode catalyst layer by coating the second mixed paste onto the third coating layer and thereafter heat treating.

\* \* \* \* \*